United States Patent [19]
Katsumata et al.

[11] Patent Number: 5,272,644
[45] Date of Patent: Dec. 21, 1993

[54] APPARATUS FOR CONTROLLING A HEATING TEMPERATURE

[75] Inventors: Hirofumi Katsumata; Hideo Fujie; Kazuto Tomikawa; Yasuhiko Nagakura, all of Numazu, Japan

[73] Assignee: Toshiba Kikai Kabushiki Kaisha, Tokyo, Japan

[21] Appl. No.: 612,436

[22] Filed: Nov. 14, 1990

[30] Foreign Application Priority Data

Nov. 24, 1989 [JP] Japan ................... 1-305480

[51] Int. Cl.⁵ ............................................. G06F 15/46
[52] U.S. Cl. .................................. 364/477; 264/40.6; 425/143
[58] Field of Search ............... 364/557, 473, 476, 477; 264/40.6, 40.7; 425/143, 144

[56] References Cited

U.S. PATENT DOCUMENTS

| Re. 31,903 | 6/1985 | Faillace | 425/144 |
|---|---|---|---|
| 4,102,958 | 7/1978 | Wertz | 264/40.6 |
| 4,430,698 | 2/1984 | Harris . | |
| 4,695,237 | 9/1987 | Inaba | 364/477 |
| 4,843,576 | 6/1989 | Smith et al. | 364/557 |
| 5,062,053 | 10/1991 | Shirai et al. | 364/476 |
| 5,088,911 | 2/1992 | Kumazaki | 264/40.6 |

FOREIGN PATENT DOCUMENTS 58-127201 7/1983 Japan ................... 364/477
WO80/02871 12/1980 PCT Int'l Appl. .

OTHER PUBLICATIONS

Barthel et al., "Self-Optimizing Temperature Controllers Reduce Commissioning Time and Costs", Siemens Energy & Automation, vol. 9, No. 4, Jul. 1987 pp. 16–18.
Chan, "Simple Overshoot-Suppressed Digital Proportional-Integral-Derivative Temperature Controller", Review of Scientific Instruments, vol. 59 No. 6, Jun. 1988, pp. 1001–1003.
Patent Abstracts of Japan, vol. 12, No. 157, May 1988.

Primary Examiner—Jerry Smith
Assistant Examiner—Steven R. Garland
Attorney, Agent, or Firm—Cushman, Darby & Cushman

[57] ABSTRACT

An apparatus for controlling a heating temperature, especially for heating a resin in a injection mold machine, a extruder and the like, includes a control device for controlling a heating means and the state of a heated barrel and a condition compensating device for issuing a compensation input to the heaters respectively in response to a reset of the control device, depending on the kinds of resin materials and molding conditions so as to prevent insufficient moldability in the injection mold machine and a deterioration of resin.

8 Claims, 7 Drawing Sheets

APPARATUS FOR CONTROLLING A HEATING TEMPERATURE

BACKGROUND OF THE INVENTION

1. Field of the Invention

This invention is broadly concerned with an apparatus for controlling a heating temperature and intended particularly to be used to heat resin in an injection mold machine or an extruder.

2. Description of the Art

Conventionally, a heating device is employed in an injection mold machine, an extruder, or the like for melting a resin material. An electric heater is generally used as a typical heating device and is controlled depending upon the type of resin and molding condition.

One example is schematically illustrated in FIG. 6. An injection mold machine 1 consists of a barrel 2, a screw 3 disposed inside the barrel 2 such that its axle axis is aligned with that of the barrel 2, and an electric band heater 4 on the peripheral surface of the barrel 2. In the operation of the machine 1, a pellet of resin material is put into a hopper 5 and transmitted through the barrel 2 while being heated and melted by the heater 4, and while being compressed and kneaded by the screw 3. The molten material is thus extruded from a nozzle 6 of the barrel 2 and subsequently injected into a die 7 to be molded.

Such a injection mold machine 1 is controlled by a control device 10. The control device 10 functions to synthetically control the rotation of the screw 3 and the temperature of the heater 4. The device 10 includes a operation setting portion 11 and a temperature setting portion 12, for presetting a certain state of the injection mold machine 1, and a control panel 13 for manual control by an operator. The temperature setting portion is connected with PID controllers 14 to regulate the electric power for heaters 4 and sensors 15 to detect a real temperature of the barrel 2.

Temperature control by the control device 10 can be schematically described by the block diagram shown in FIG. 7. In the drawing, r(t) is a desired set temperature of the temperature setting portion 12, and control input u(t) is a heating control from the PID controller 14 to the heater 4. Controlled variable y(t) is the real temperature of the barrel 2 based on the heating control and varies with the barrel 2 in accordance with the object to be heated and sorts of resin materials fed into the barrel 2. The real temperature of the barrel 2 detected by the sensor 15 is negatively fed back to an input of the PID controller 14, thereby enabling feedback control to be carried out so as to decrease a deflection e(t) of a set temperature and real temperature. Accordingly, the barrel 2 is set at a predetermined set temperature by the heater 4.

The conventional apparatus shown in FIG. 6 has three lines each consisting of the heater 4, the sensor 15, and the controller 14 toward three portions of the barrel 2; a base portion, a middle portion, and a forward portion. These lines are respectively controlled at a certain set temperature by the temperature setting portion 12 to conduct a zone control of the barrel 2.

It is known that if the temperature of a resin material is low, its moldability is likely to decline, and if it is high, decomposition may result. Hence, temperature control of the barrel 2 is necessary for executing a desirable molding with reduced temperature fluctuation.

However, the conventional injection mold machine 1 can not prevent a delay of the temperature control in response to some alterations of conditions when molding. Since feedback control such as the PID control is employed for the control device 10, the heating control for the heater 4 is always done after detecting some change of the temperature of the barrel 4. The fluctuation of the temperature becomes rather severe due to the delay of the temperature control, so that the resin in the barrel 2 is not melted enough or decomposed due to excess heating.

Moreover, when changing the set temperature of the injection mold machine 1, or when changing the operating condition of the machine 1, a slight deviation of the real temperature of the barrel 2 is caused.

This is because while heating up the temperature of the barrel 2 with no resin material therein, the temperature is easily changed with a small quantity of heat. But, in an operation in which the resin fed into the barrel 2 is melted and not extruded, it is necessary to change the temperature to apply a greater quantity of heat to the barrel 2. In a molding cycle operation, in which the resin is continuously melted and extruded from the barrel 2, a large amount of heat is necessary to process the resin material successively fed into the barrel 2. Otherwise, the necessary quantity of heat can be changed depending upon an operation cycle of the machine 1.

Hence, when shifting the operation from the preparation step to the molding cycle operation, the necessary quantity of heat increases and the temperature of the barrel 2 decreases. During the molding cycle operation which needs a relatively large quantity of heat, the fluctuation of the temperature tends to be greater because of the delay of heating control, and faulty moldings are produced.

An object of the present invention is to provide an apparatus for accurately and securely controlling a heating temperature in response to some fluctuation of temperature depending on the states of operation of an injection mold machine.

SUMMARY OF THE INVENTION

The present invention relates to an apparatus for controlling a heating temperature including a control device for controlling a heating device and a temperature state of a portion to be heated and a condition compensating device for issuing a compensation input to the heating device in response to a resetting of the control device.

In the embodiment of the apparatus, any suitable heater may be used as the heating device; injection mold machines and the like may be comparable to the object to be heated by the heater, and the operation control device of the injection mold machine may be comparable to the control device.

Objects to be controlled are the operation state of the objects to be heated, a heating condition of the heating device, and other elements which could influence the temperature of the object to be heated.

Any suitable type of condition compensating device may be employed; for example, compensation inputs may be preliminarily stored in the form of a function or a data-table to comply with anticipated resets and a suitable compensation input may be output after detecting a reset by the control device.

According to the present invention, the mentioned control device controls the heating condition of the heating device and the operation state of the object to be heated in response to a reset to thereby heat the object in a predetermined manner and maintain the desired set temperature of the heating device.

Once a set condition of the control device is reset, the heating condition for heating the object must be changed. At this moment, the condition compensating device applies a compensation input based on the reset condition in the control device to the heating device in order to accommodate to the changed heating condition.

Accordingly, the heating device is directly adjusted into the changed heating condition in response to a reset condition in the control device. Hence, the inevitable temperature fluctuation caused by the control device can be minimized so as to achieve the mentioned object of the present invention with a quick and accurate temperature control.

DETAILED DESCRIPTION OF THE EXEMPLARY EMBODIMENT

The preferred embodiment of the present invention will now be described with reference to the drawings.

Figure 1:
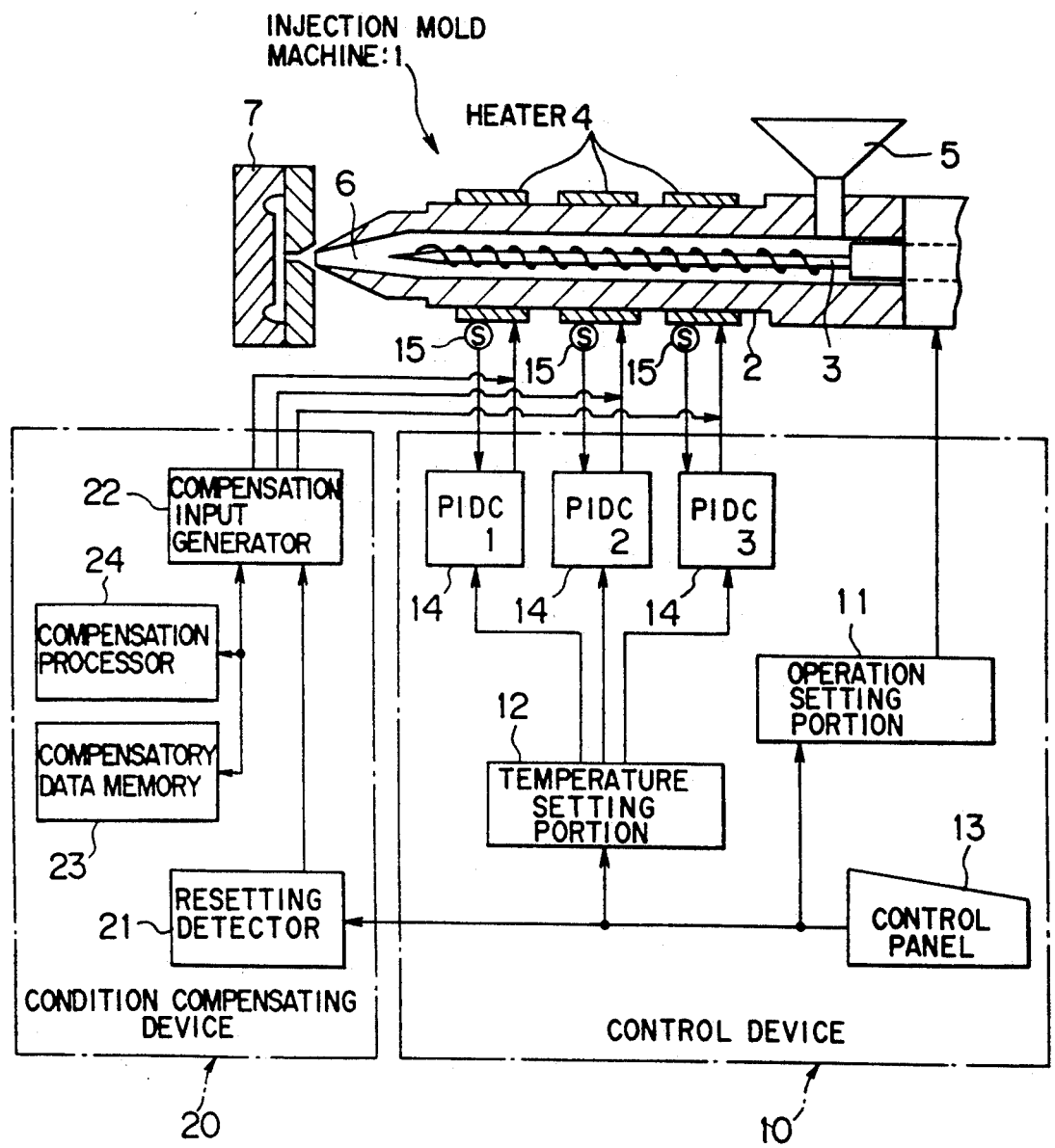
FIG. 1 is a block diagram showing a preferred embodiment of the present invention.
Figure 6:
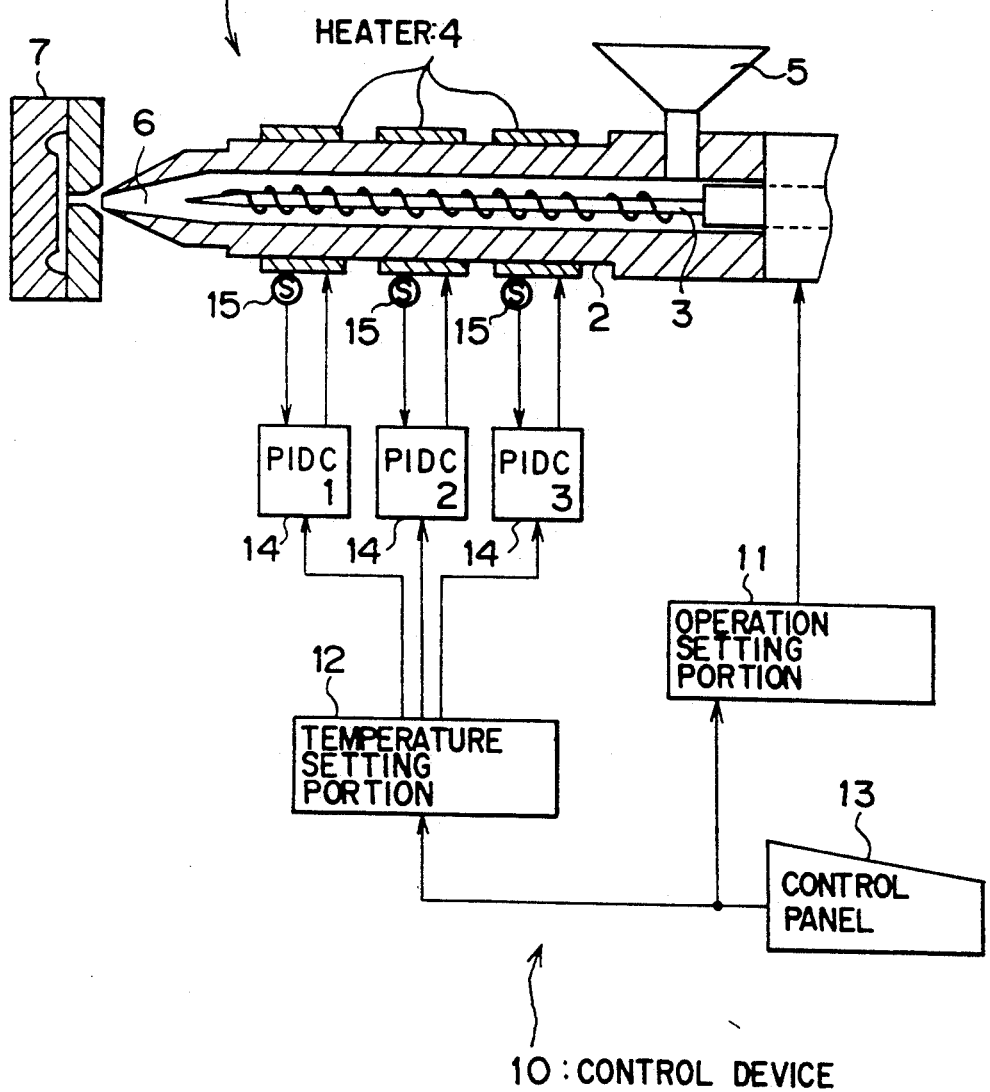
FIG. 6 is a block diagram showing a conventional construction of a heat controlling apparatus.
Figure 7:
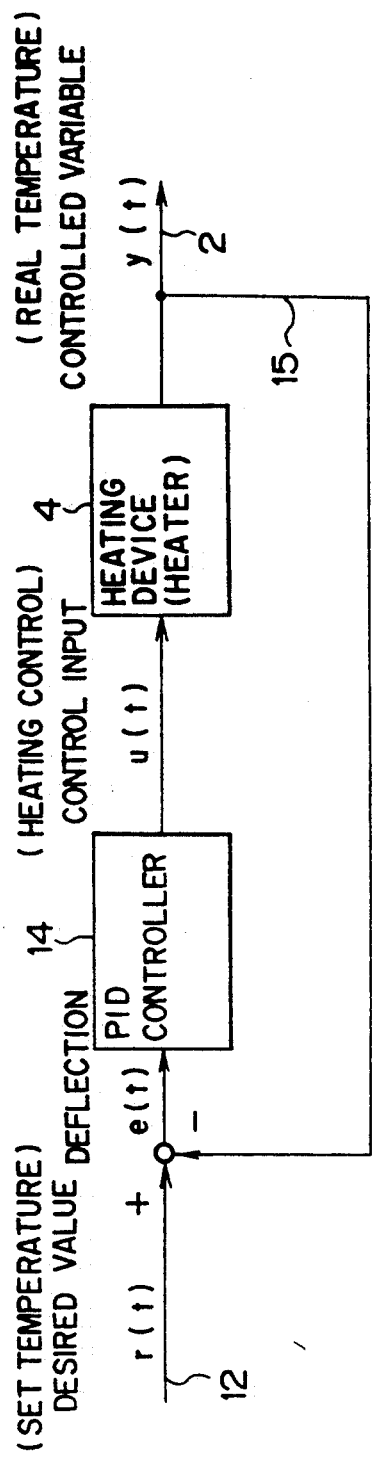
FIG. 7 is a block diagram showing how the conventional apparatus is controlled.

An apparatus for controlling a heating temperature which is applied to an injection mold machine according to the present invention is schematically shown in FIG. 1. The injection mold machine is denoted by the numeral 1 as the object to be heated. Denoted by 4 is a heating device. Denoted by 10 is a control device to control these devices. In the drawings, the injection mold machine 1 and the control device 10 are the same as shown in FIG. 6. Incidentally, in the description of the following embodiment, the same reference numerals will be used to designate the same or similar components as those in the conventional example, so that the description will be simplified.

The control device 10 is provided with a condition compensating device 20 according to the present invention.

The condition compensating device 20 controls the heater 4 by issuing a compensation input in response to a reset signal from the control device 10. The device 20 consists of a resetting detector 21, a compensation input generator 22, a compensatory data memory 23, and a compensation processor 24.

The resetting detector 21 receives a command for resetting temperature from a control panel 13. The reset command is also received by a temperature setting portion 12 and an operation setting portion 11 for changing the operation state of the injection mold machine 1. In the resetting detector 21, temperature control elements of the barrel 2 are stored. Hence, the resetting detector 21 detects the command corresponding to the elements stored therein, turning on the compensation input generator 22.

The compensation input generator 22 investigates the command input to the resetting detector 21, adjusts the heater 4 as determined by the compensatory data memory 23 and the compensation processor 24.

The compensatory data memory 23 stores, in the form of a function or data-table, ratios of the necessary quantity of heat in the barrel 2 during each state of the operation of the injection mold machine 1, e.g. the idling operation, the ordinary running operation, and the molding cycle operation. The memory 23 also stores ratios of the necessary quantity of heat in response to the molding cycle speed and in response to the set temperature or the fluctuations of the temperature. Accordingly, the appropriate quantity of heat for the barrel 2 can be obtained based on the state of the injection mold machine 1.

The compensation processor 24 compares the present heat requirement for the injection mold machine, which is issued by the compensatory data memory 23, with the heat required when a reset is issued by the control device 10 to adjust the quantity of heat for the heater 4.

The adjusted quantity of heat from the condition compensating device 20 is added to the output for the heater 4 by the control device 10 as the compensation input to preliminarily compensate for the probable fluctuation of temperature after resetting.

The compensatory data memory 23 and the compensation processor 24 are arranged so as to provide a suitable compensation input, which is predetermined from investigations or testing, when conducting a reset of the injection mold machine 1.

How the compensation input is determined in response to a reset by the control device 10 is described hereunder.

Figure 2:
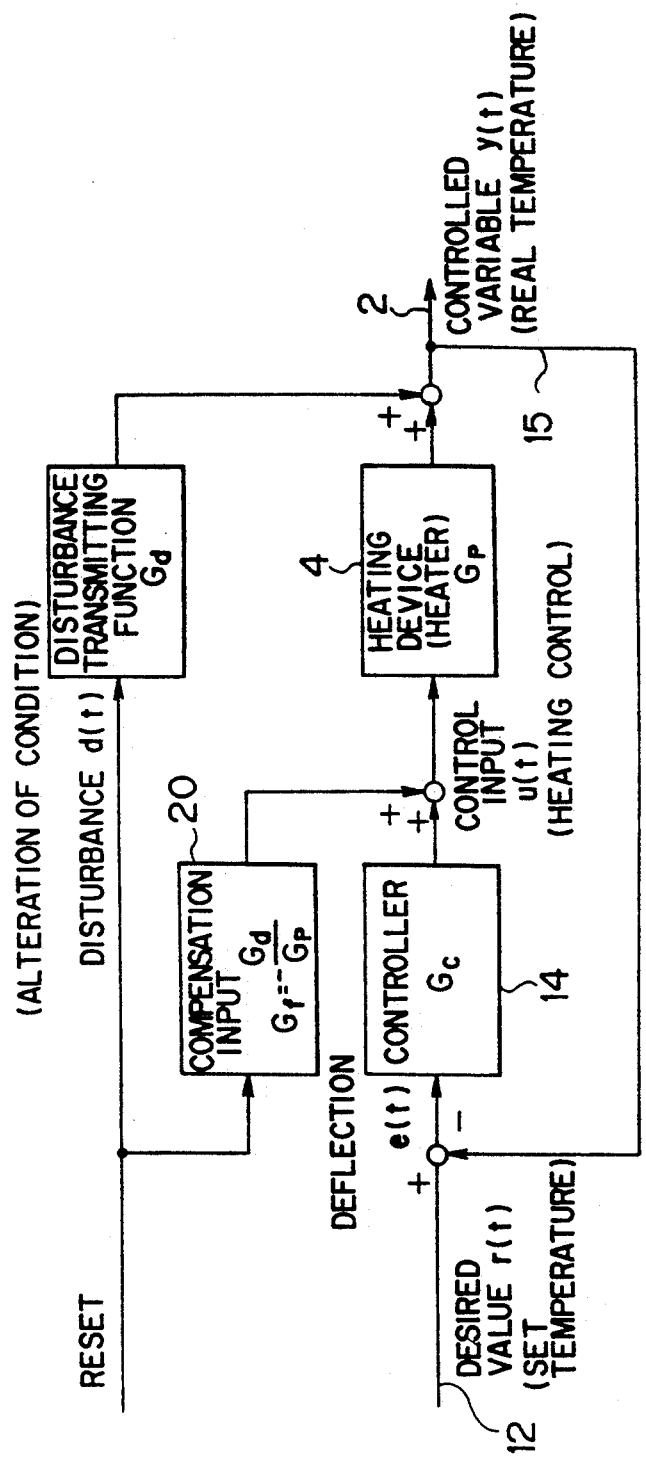
FIG. 2 is a block diagram showing how the apparatus described in FIG. 1 is controlled.

The temperature control by the control device 10 and the condition compensating device 20 is described with reference to the block diagram shown in FIG. 2. In the drawing, $r(t)$ is a desired set temperature of the temperature setting portion 12, and $u(t)$ is a heating control input from the PID controller 14 to the heater 4. Controlled variable $y(t)$ is a real temperature of the barrel 2 based on the heating control and changes in response to the object to be heated and sorts of resin materials fed into the barrel 2. The real temperature of the barrel 2 detected by the sensor 15 is negatively fed back to an input of the PID controller 14 in a feed-back control scheme to decrease the deflection $e(t)$ of a set temperature and real temperature. Accordingly, the barrel 2 is set at a predetermined set temperature by the heater 4.

The temperature fluctuation of the barrel 2 due to the reset by the control device 10 may influence, as a disturbance $d(t)$, the real temperature of the barrel 2. The compensation input based on the reset is correspondingly input from the condition compensating device 20 to the heater 4.

If a transfer function of PID controller 14 is expressed as $Gc$, a transfer function of the heating device is expressed as $Gp$, a transfer function of the disturbance is expressed as $Gd$, a transfer function of the compensation input is expressed as $Gf$, and a transfer function $Gf$ is expressed as $-Gd/Gp$, the temperature change of the heater 4 owing to the compensation input can be described by the formula $Gf \times Gp = -Gd$, hence the disturbance transfer function $Gd$ is cancelled. In the end, the compensation input $Gf = -Gd/Gp$ can be determined by the transfer functions of the heating device Gp.

Figure 4:
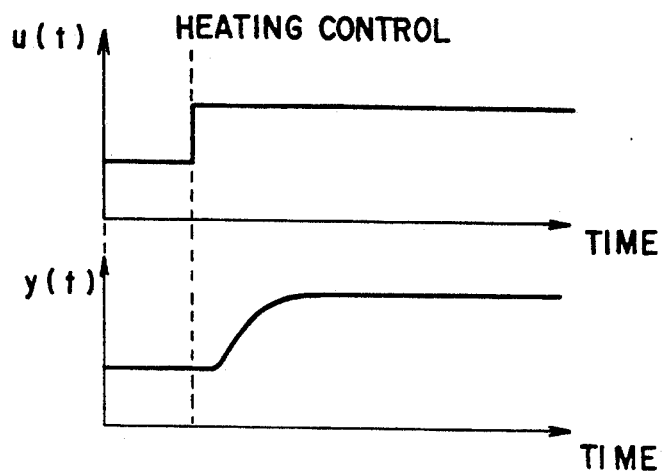
FIGS. 4 and 5 are graphical representations showing the timing of the setting order of a compensation input.

The transfer function of the heating device Gp can be determined as follows. The control input u(t), the controlled variable y(t), and the disturbance d(t) are transformed by the Laplace transform and expressed as U(s), Y(s), and D(s). As shown in FIG. 4, when stepping up the control input u(t) with no feedback, the controlled variable y(t) is delayed but kept constant. Since Y(s)=Gp(s)×U(s) and Gp(s)=Y(s)/U(s), Gp can be determined by the input-output ratio y(t)/u(t) of the heater 4.

Figure 5:
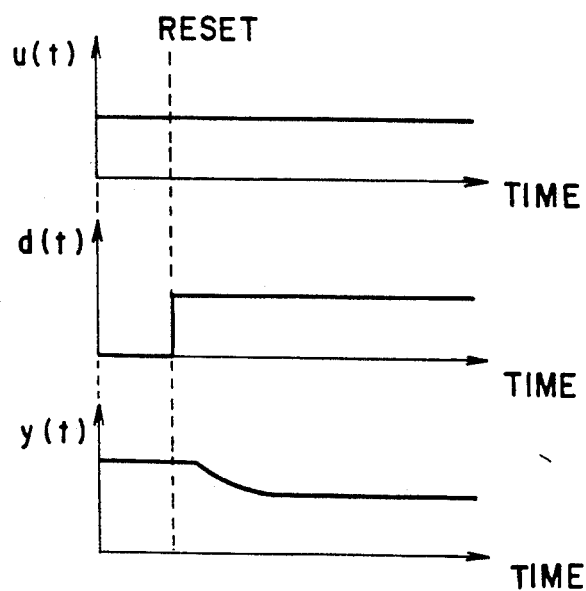

The transfer function of the disturbance d(t) can be determined as follows. When the disturbance d(t) has appeared as shown in FIG. 5, the relationship Y(s)=Gp(s)×U(s)+Gd(s)×D(s) exists. The disturbance d(t) comes out if there is a reset and it appears as a step whenever resetting is not undertaken. Assuming that the control input u(t) remains flat, Y(s) and Gd(s) can be obtained by formulas Y(s)=Gd(s)×D(s) and Gd(s)=Y(s)/D(s). Gd is determined by the ratio y(t)/d(t) which compares the real temperature of the barrel 2 with the temperature fluctuation owing to reset.

The practical operation of the preferred embodiment will now be described.

When the operator sets the operation setting portion 11 and the temperature setting portion 12 at the control panel 13, the control device 10 controls the motion of the injection mold machine 1 and the heating condition of the heater 4 based on the set. The operation of the injection mold device 1 is controlled by the operation setting portion 11 and the temperature is kept constant by the temperature setting portion 12.

Resetting the operation state of the machine 1 already set by the operation setting portion 11 or the temperature already set by the temperature setting portion 12, is detected by the resetting detector 21. The compensation input generator 22 reads the desired quantity of heat at present and after resetting from the compensatory data memory 23. The compensation processor 24 calculates the difference in the quantity of heat so that the temperature of the heater 4 can be controlled. Accordingly, the fluctuation of the quantity of heat at the barrel 2 because of the resetting is compensated for, and the barrel 2 is kept at a constant temperature.

According to the present invention, some of following effects may be attained.

The heating control for slight temperature fluctuations of the barrel 2 under the certain resetting can be carried out at the control device 10. The heating control for considerable temperature fluctuations of the barrel 2 because of the resetting can be compensated by the condition compensating device 20.

Hence, the negative effects of the feedback control device 10 resulting in the delay or fluctuation of the heating control after resetting can be kept from occurring. The temperature control of the injection mold machine 1 is therefore quickly and accurately controlled.

The compensation input by the condition compensating device 20 is issued in response to the reset of the temperature and operation state by the control device 10 and enables the injection mold machine 1 to shift its operation state from the preparation step to the molding cycle operation. The temporary temperature fluctuation can be minimized to prevent insufficient moldability in the injection mold machine 1 and deterioration of the resin.

The injection mold machine 1, the heater 4, and the control device 10 each may be of a conventional type, and the condition compensating device 20 which is additionally introduced in the present invention is of a simple construction so that it may be easily utilized by a skilled person in the art.

One operative example of the injection mold machine 1 according to the present invention will now be described. In the example, the real temperature of the barrel 2 is measured when the molding cycle operation is started under the stable temperature of the heater 4.

Figure 3:
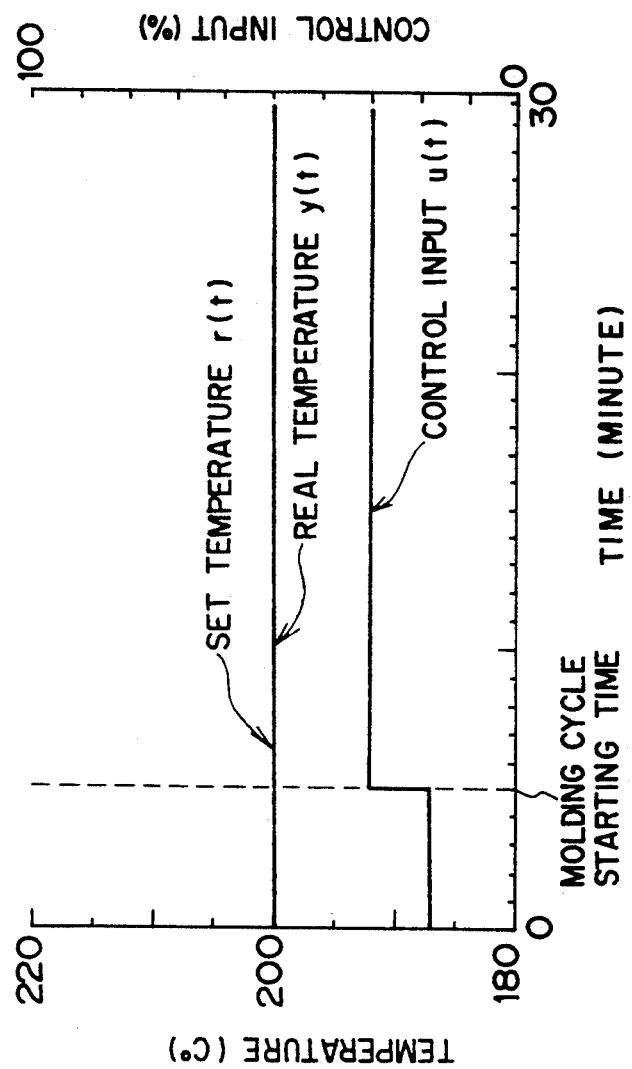
FIG. 3 is a graphical representation of the operation of the apparatus in FIG. 1.

In FIG. 3, the control input u(t) controls the heater 4 when the maximum heating input is set at 100%. In other words, the control input u(t) is a total of the outputs from the control device 10 and from the condition compensating device 20. The operation input u(t) is increased once in the form of a step in response to the start of the molding cycle operation and thereafter kept constant. The increase results in heating control by the compensation input issued from the condition compensating device 20. Due to the compensation, there is no fluctuation caused by the control device 10. While the operation input u(t) is kept constant, the real temperature y(t) of the barrel 2 is equated with the set temperature (t). It may be recognized that the accurate control is performed without the temperature fluctuation.

A control system which is not provided with the condition compensating device 20 is hereunder described under the same conditions of the operative example already mentioned.

Figure 8:
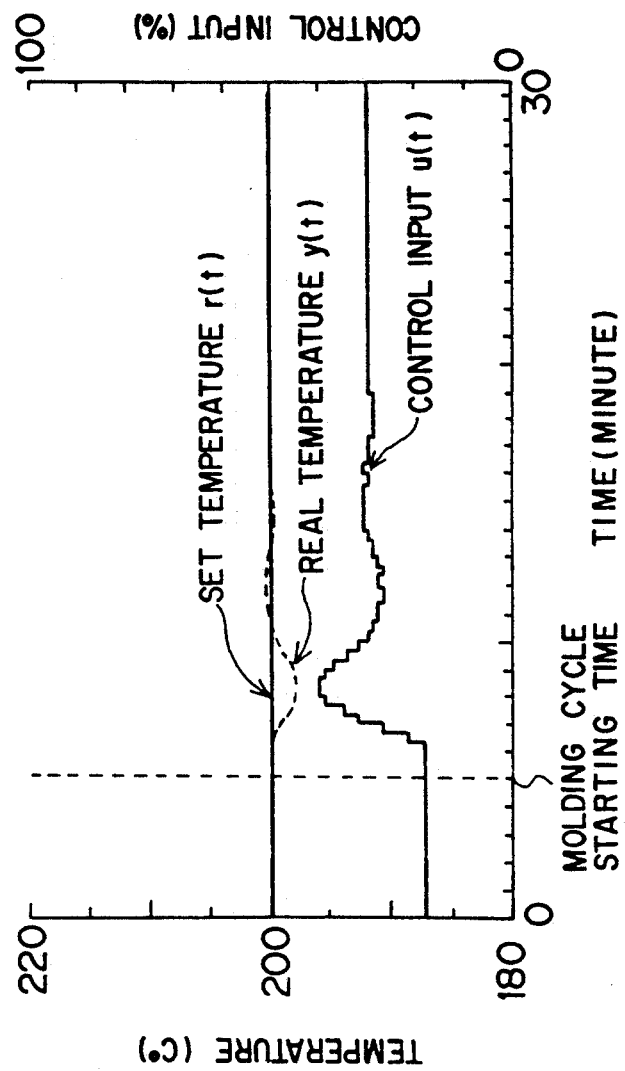
FIG. 8 is a graphical representation showing a control example based on the conventional apparatus.

In FIG. 8, the control input u(t) describes the heating control of the heater 4 by the control device 10, and will not deviate at the moment of starting the molding cycle operation. However, when the real temperature y(t) of the barrel 2 is considerably decreased, u(t) suddenly increases. On the contrary, the real temperature y(t) exceeds the set temperature r(t) in response to the increase of the control input u(t). Thus, when not using the condition compensating device 20, the heating control for the heater 4 is delayed, the real temperature y(t) of the barrel 2 fluctuates considerably, and the heating control requires time to stabilize the real temperature y(t).

The present invention is not limited to the above embodiment; the following modifications may be attained.

For example, the compensation input corresponding to the various states of resetting may be preliminarily calculated and stored, and its input directly read out when resetting. Otherwise, the fundamental nature of temperature only may be stored and the temporal calculation performed when resetting. These modifications are selective. The stored data pattern may be in the form of a function or a data-table.

The states controllable by the control device 10 are not limited to the operation state of the injection mold machine 1 and the heating condition of the heater 4, but may be any other state. The system of the control device 10 may be separated. In this situation, it is preferable to join respective control systems for the heater 4 and the barrel 2 into one condition compensating device.

The items to be reset are not only the operation state of the injection mold machine 1 and the temperature of the heater 4; any item which may affect the temperature of the barrel 2 may be registered in the condition compensating device 20.

The object to be heated, the heating device, and the control device are not only the injection mold machine 2, the heater 4, and the control device 10 but any types of heating devices and control devices employed in other kinds of injection mold machines, extruders and the like.

As mentioned above, according to the apparatus for controlling heating temperature in the present invention, accurate and stable temperature control may be achieved when temperature fluctuation is caused by the change of the operation state of the object to be heated.

What is claimed is:

1. A temperature controller for controlling the heating of an object, comprising:

control means for controlling a heater, the control means capable of issuing a temperature reset command indicative of a desired temperature change;

a resetting detector for detecting the reset command;

a compensatory data memory for storing control data; and a compensation processor for deriving a heating control signal corresponding to the desired temperature change in accordance with the control data from the compensatory data memory; and a compensation input generator for issuing the heating control signal to the heater in response to the reset command to effect the desired temperature change.

2. The controller of claim 1, wherein the compensatory data memory is a data table.

3. The controller of claim 1, wherein the reset command is also indicative of an operation state of the object to be heated.

4. The controller of claim 1, wherein the object to be heated is a resin.

5. The controller of claim 1, wherein the heating control signal is a step function.

6. A temperature controller for controlling the heating of an object, comprising:

control means for controlling a heater, the control means capable of issuing a reset command indicative of a desired temperature change;

a resetting detector for detecting the reset command; and a compensation input generator for generating a control signal and issuing the control signal to the heater to effect the desired temperature change in response to the reset command, the compensation input generator storing predetermined control signal parameters corresponding to a plurality of predetermined desired temperature change.

7. The controller of claim 6, wherein the object to be heated is a resin.

8. The controller of claim 6, wherein the control signal is a step function.

* * * * *